Sept. 6, 1966  R. H. LANGDON  3,270,447
DISPLAY PANEL

Filed Nov. 14, 1963  2 Sheets-Sheet 1

INVENTOR.
Richard H. Langdon
BY Clarence P. Patty, Jr.
ATTORNEY

Sept. 6, 1966 R. H. LANGDON 3,270,447
DISPLAY PANEL
Filed Nov. 14, 1963 2 Sheets-Sheet 2

INVENTOR.
Richard H. Langdon
BY
ATTORNEY

United States Patent Office 3,270,447
Patented Sept. 6, 1966

3,270,447
DISPLAY PANEL
Richard H. Langdon, Tarrytown, N.Y., assignor to Corning Glass Works, Corning, N.Y., a corporation of New York
Filed Nov. 14, 1963, Ser. No. 323,804
13 Claims. (Cl. 40—52)

This invention relates to an image display panel. More particularly, the invention relates to an image display panel or screen which may be manually, mechanically or electromechanically actuated to display different or varying images of persons, objects or scenes, similar to those produced by so-called half tone reproduction methods.

While devices for displaying different images in outline or silhouette are old in the art, insofar as is known, prior to the present invention, no apparatus or method has been provided for displaying images similar to half tone reproductions, that is, images which, by means of shading, give an impression to a viewer of having depth. It is accordingly an object of the present invention to provide a novel display panel or screen which may be manually or automatically actuated to selectively exhibit different images of persons, scenes, etc.

It is a second object of the invention to provide a display device which may be illuminated by either incident sunlight or "artificial" light and can, therefore, be employed for daytime outside displays, or for displays in lighted rooms or lighted exhibition buildings, etc.

It is another object of the invention to provide a display apparatus which may be mechanically or electromechanically actuated to display rapidly changing images and, thereby, convey, to the viewers of the display apparatus, impressions similar to that provided by motion picture projection apparatus.

In accomplishing the above objects of the invention, there is provided a display panel comprising a screen having a honeycomb, lattice or mosaic pattern of adjacent or contiguous cells which normally display a color of one extreme but each of which is provided with a light reflecting device or reflector which may be selectively actuated to cause its respective cell to display color tones of degrees varying between said one extreme and a color of a second substantially opposite extreme, that is, color tones similar to that of half tone reproductions, such tones being attained by selectively shading each said reflector in the manner hereinafter discussed. The colors referred to are preferably black and white, whereby said color tones comprise the series of grays intermediate black and white. However, it will be understood by those skilled in the art that other colors, both of which have an attribute of substantially low saturation, and one of which has an attribute of substantially low brilliance while the other has an attribute of substantially high brilliance, may be employed in lieu of black and white, the terms low brilliance and high brilliance meaning the brilliance of the colors relative to each other.

Other objects and characteristic features of the invention will become apparent as the description proceeds.

One specific example of apparatus comprising the invention will be described and the novel features thereof will then be pointed out in the appended claims.

It is believed that it will be expedient to here point out that as employed herein in reference to colors, the term color tones is intended to include both shades and tints.

Figure 1:
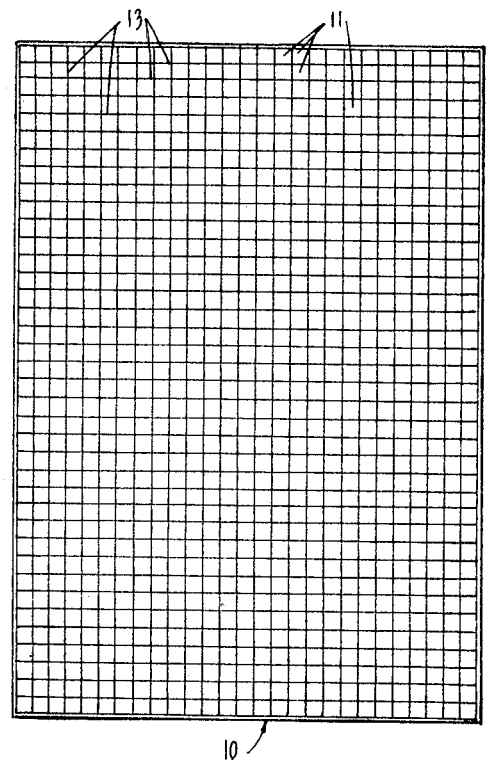
FIG. 1 is a front elevational view illustrating the plurality of cells of one form of display panel embodying the invention and as such cells appear to a viewer when no image is displayed on the panel.
Figure 3:
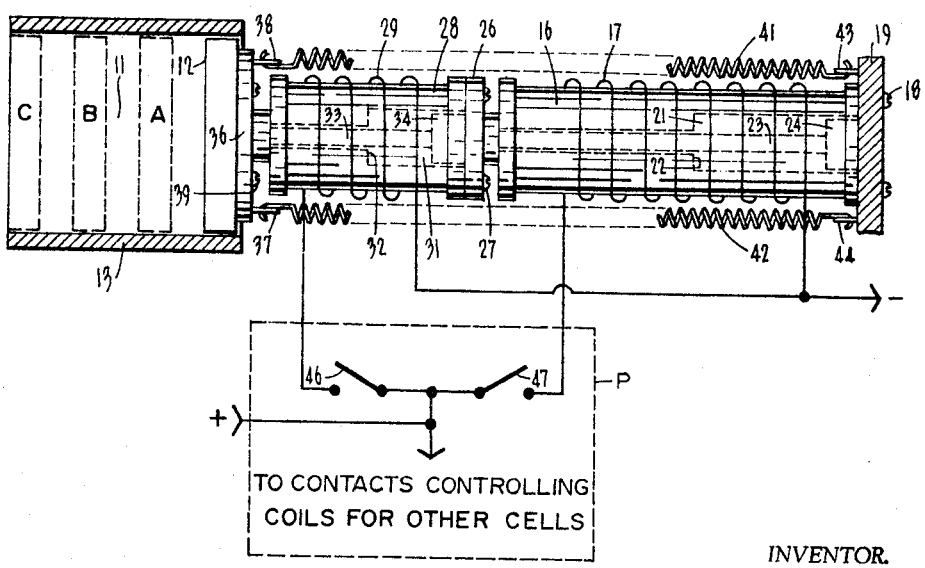

FIG. 3 comprises a longitudinal cross sectional view of one of the cells of the display panel and illustrates one arrangement of apparatus and control system therefor, including a schematic wiring diagram, which may be employed for automatically actuating the reflector of each of the plurality of cells comprising a display panel such as shown in FIG. 1.

Similar reference characters refer to similar parts in each of the drawings.

FIG. 1 of the drawings illustrates a display device 10 comprising a lattice or a plurality of adjacent cells, such as 11, including sidewalls, such as 13, having a square cross sectional configuration and each of which is provided with a reflector or light reflecting device, such as 12 (FIGS. 2 and 3), which is movable to various depths in its respective cell so that the sidewalls of such cell shade the reflector in varying degrees. The interior sidewalls of the cells are all of a first selected color having an attribute of low saturation and an attribute of brilliance of a relatively low degree, such as, for example, the color black. The reflectors of the cells are of a second selected color also having an attribute of low saturation and an attribute of brilliance of a relatively high degree contrasting substantially with the brilliance attribute of the color of said sidewalls of said cells, such as, for example, the color white as contrasted to the above example of the color black for the sidewalls of the cells. It will be understood, however, that, as previously mentioned, contrasting colors other than black and white may be used for the colors of the cells and reflectors, respectively.

For purposes of simplification of the drawing, the display panel of FIG. 1 is illustrated as having a relatively small number of cells, and in actuality the multiplicity of cells provided would comprise a substantially greater number than that illustrated. This would, of course, depend on the desired fidelity for the image displayed to the viewers of the panel, the distance such viewers are to be from the panel, the size of the individual cells of the panel and the scope of the persons, objects or scenes to be displayed by the panel.

It is also pointed out at this time that, although as illustrated in the drawings the display panel comprises a multiplicity of cells of square cross sectional configuration arranged in vertical and horizontal rows, such cells of the panel could equally as well be arranged in staggered rows, could be arranged diagonally, or the panel could comprise a plurality of cells having configurations of parallelograms other than squares, or of triangular, hexagonal, or even round cross sectional shape, as desired.

Figure 2:
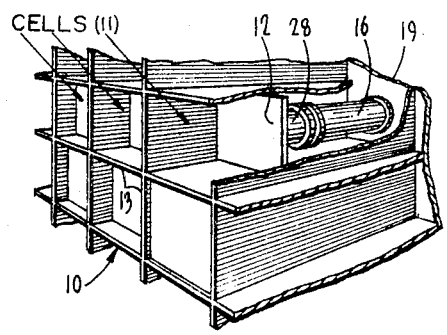
FIG. 2 is a fragmentary perspective view of the display screen shown in FIG. 1 and illustrates the reflectors or light reflective devices in adjacent cells in different positions for displaying different color tones.

Referring to FIG. 2 of the drawings, a fragment of the panel of FIG. 1 is shown in perspective to illustrate in greater detail the arrangement of each cell 11 and the respective reflectors, such as 12, provided in each such cell, the reflectors being shown at different depths in their respective cells to illustrate the manner in which the cells are caused to vary the color tones displayed thereby. As will be readily apparent to those skilled in the art, the reflectors, such as 12, may be manually moved to different positions in their respective cells to cause the complete display panel to exhibit, at separate times, various images, or alternatively, each reflector may be actuated to various positions by a mechanically or electromechanically controlled actuator such as illustrated in one of the cells shown in FIG. 2. Such an actuator, which may be employed in conjunction with each cell for variably positioning the reflector therein, is illustrated in detail in FIG. 3 of the drawings.

Referring to FIG. 3, there is shown in longitudinal cross section, a cell, such as 11, defined by sidewalls, such as 13, and having provided therein a reflector, such as 12, such reflector being positioned within its cell to its fully retracted position, that is, to the position of its greatest depth within its respective cell. At such time the cell would display a maximum amount of its sidewalls and, in addition, the reflector therein would be shaded to a maximum extent. The cell would, therefore, display its darkest color tone at such time.

A first solenoid coil 16 having a control winding 17 is shown in FIG. 3 mounted, as by bolts 18, on a section of a backwall 19 of the display panel 10. Such solenoid coil also comprises a center hollow cylindrical portion or cavity 21 extending longitudinally therethrough, in the usual manner, but which is of a larger diameter at one end thereof than at the other so that a shoulder portion 22 is provided approximately midway through the coil. A plunger or core 23 of a non-magnetic material is provided in the hollow cylindrical portion 21 of coil 16 and is provided on one end thereof with an enlarged portion 24 consisting of a magnetizable material and which fits snugly but movably within the end of the hollow portion or cavity 21 having the larger diameter. The remainder of the plunger or core 23 is of such a diameter as to fit snugly but movably within the end of the cavity 21 having the smaller diameter. By this arrangement it is readily apparent that core 23 is movable, within the coil 16, from the position shown in the drawing to a position in which the enlarged portion 24 of the core rests against shoulder portion 22 of the cavity 21 of coil 16. The purpose of such arrangement will become apparent hereinafter in this description.

The end of core 23, opposite the end provided with the enlarged portion 24, is provided with a flange 26 to which is attached, as by bolts such as 27, a second solenoid coil 28 having a control winding 29. Solenoid coils 16 and 28 are thus arranged in a tandem relationship in which coil 28 is supported and carried by the plunger or core 23 of coil 16. The purpose of this arrangement will also be made apparent hereinafter.

Coil 28 also includes a hollow cylindrical portion or cavity 31, similar to that provided in coil 16, and including a shoulder portion 32 approximately midway through the coil. A plunger or core 33, similar to core 23 in coil 16, is provided in the hollow center portion 31 of coil 28, such core also being provided with an enlarged portion 34 of a magnetizable material similar to the enlarged portion 24 of core 23, such enlarged portion coming to rest against the shoulder portion 32 when the core 33 is moved from its position shown in the drawing to its opposite extreme position as hereinafter discussed.

The end of core 33, opposite the end provided with the enlarged portion 34, is provided with a flange 36 to which is attached, as by bolts such as 39, the reflector 12 provided in the respective cell shown in FIG. 3. By this arrangement, it will be readily apparent that reflector 12 is supported and carried by the plunger or core 33 of coil 28 which, as previously mentioned, is supported and carried by the core 23 of coil 16. This will be further discussed hereinafter.

Reflector 12 is provided with eyelets, such as 37 and 38, through which is inserted the hooked ends of a pair of wire springs 42 and 41, respectively. The opposite ends of springs 41 and 42 are also provided with hooks which are inserted through eyelets 43 and 44, respectively, provided on backwall 19 of display panel 10. Springs 41 and 42 normally supply sufficient tension to the reflector to maintain it, and the cores 23 and 33 of coils 16 and 28, respectively, in their positions shown in FIG. 3 of the drawings, such positions being considered the normal positions of such devices. When, however, the reflector and the cores of coils 16 and 28 are actuated to other positions, in the manner hereinafter described, springs 41 and 42 are expanded and supply additional tension to the reflector and therethrough to the cores 23 and 33, to return such devices to their normal positions when the forces moving the devices to said other positions are later removed. This will be discussed further in an operational example of the apparatus of FIG. 3.

A programmer designated P is shown in block diagram form in FIG. 3 and includes a multiplicity of electrical circuit controlling contacts, only two of which are, for purposes of simplicity, shown. The two contacts illustrated are designated 46 and 47, respectively, and are shown as being in their normally open or non-circuit closing positions. Such contacts 46 and 47 are respectively employed for energizing the control windings 29 and 17, of coils 28 and 16, respectively, as hereinafter discussed. It will be understood that, in actuality, one such pair of contacts would be provided in the programmer P for each cell of the display panel, all of such contacts being actuated to closed positions at various times in accordance with a prescribed program, such program being provided by a perforated or magnetic tape, a contact-closing revolving drum, or other such apparatus which may be used for controlling selectively and sequentially the opening and closing of a multiplicity of circuits in accordance with a prescribed program. Such programmers or programming devices are well known, and any one of a number of such devices may be employed for programmer P providing that the device chosen is capable of, that is, has the capacity for, controlling the number of circuits to be controlled.

A circuit for energizing the control winding 29 of solenoid coil 28 extends from the positive terminal (+) of a source of control current (not shown) over contact 46 of programmer P in its closed position, and thence to and through said control winding to the negative terminal (−) of said source of control current. A similar circuit is provided for the control winding 17 of solenoid coil 16, such circuit extending from the positive terminal of said source of current over contact 47 of programmer P in its closed position, and thence to and through control winding 17 to the negative terminal of said current source.

By the apparatus arrangement shown in FIG. 3 of the drawings, a reflector, such as 12, may be actuated between four different positions in its respective cell. When a reflector is in its most retracted position within its respective cell, as shown in FIG. 3 of the drawings, the reflector will be in the maximum amount of shadow and such cell will exhibit its darkest color tone to a viewer thereof, as previously mentioned. As a reflector is actuated to less retracted positions in its respective cell, the reflector is in less shadow, that is, becomes less shaded, and such cell exhibits lighter color tones to a viewer, the lightest color tone being exhibited, of course, when the reflector occupies a position at the front of the cell.

It will now be assumed that contact 46 of programmer P (FIG. 3) becomes closed (contact 47 remaining open) and thereby closes the energizing circuit to winding 29 of coil 28. Such energization of winding 29 causes, in the manner well known to those skilled in the art, the core 33 of coil 28 to be rapidly actuated towards the middle of the coil, such core so moving until the enlarged portion 34 of the core rests against shoulder portion 32 of the cylindrical cavity 31 in the center of the coil. At such time reflector 12 is actuated in its cell to a position indicated by the dotted outline of the reflector at A.

If contact 47 of programmer P becomes closed (contact 46 remaining open) the energizing circuit to winding 17 of solenoid coil 16 becomes energized and the plunger or core 23 of the coil is actuated, through the cylindrical cavity 21 in the center of the coil, until the enlarged portion 24 of core 23 rests against the shoulder portion 22 provided in such cavity. At such time, coil 28 is actuated, as viewed in the drawing, in a lefthand direction and reflector 12 is actuated by the movement of coil 28 to a position indicated by the dotted outline of the reflector at B.

Assuming that both contacts 46 and 47 of programmer P become closed to energize the control windings of both solenoid coils at the same time, it is obvious that the cores of both the coils are actuated toward the middle of their respective coils and reflector 12 is actuated to a position indicated by the dotted outline of the reflector at C.

Under any of the above described conditions, when one or both of the control windings of the solenoid coils become de-energized, following a period of energization thereof, such de-energization occurring due to the subsequent opening of one or both of contacts 46 or 47 of programmer P following a prior period of closing thereof, springs 41 and 42 actuate the cores of the solenoid coils and reflector 12 to a position in accordance with the then energized or de-energized condition of the control windings of the respective coils.

Summarizing the operation of the apparatus shown in FIG. 3, by such arrangement of apparatus, reflector 12 may be selectively moved between and positioned at any one of four positions according to the selective energization of the control windings of solenoid coils 16 and 28. That is, when both coils are de-energized the reflector occupies its normal position shown in FIG. 3. When the control winding of coil 28 alone is energized the reflector is moved to position A. When the control winding of coil 16 alone is energized the reflector is moved to position B. When the control windings of both coils are energized, the reflector is moved to position C.

It will be readily apparent that additional solenoid coils could be arranged in tandem with the two coils shown in FIG. 3 in a manner similar to that shown, and additional positions for reflector 12 would then be provided, each additional coil doubling the number of positions to which the reflector could be actuated. That is, a tandem set of three coils could provide eight positions, a tandem set of four coils could provide sixteen positions etc. Of course additional contacts or circuit controllers would have to be provided in programmer P to selectively control the additional solenoid coils.

It is to be understood that the apparatus of FIG. 3 is shown and described only as an example of one apparatus that may be employed for the automatic selective positioning of reflectors, such as 12, within their respective cells, and that numerous other apparatus could as well be provided for such automatic actuation of the reflectors.

It is also pointed out that, although the front of the display panel 10 is shown in the drawings as being flat, the front of the panel could, if so desired, be concavely curved so that all the cells 11 of the panel would be displayed at more advantageous angles to viewers of the panel.

I claim:

1. An image display screen comprising, in combination, a lattice of recessed cells each of which adjoins adjacent cells by common sidewalls in a plane and all being of a color having an attribute of low saturation and low brilliance; a reflector operable in each cell, means for moving each reflector from a first extreme position to a second extreme position, said first extreme position rendering each reflector to be shaded by the sidewalls of its respective cell, each reflector separately operable through a succession of progressively less shaded positions to said second extreme position in which it is substantially unshaded by the sidewalls of its respective cell, all such reflectors being of a color having low saturation and an attribute of high brilliance.

2. Apparatus according to claim 1 wherein said colors are achromatic colors.

3. Apparatus according to claim 1 wherein the first of said colors is black and the second of said colors is white.

4. Apparatus according to claim 1 and further including means to selectively operate said reflectors to various ones of said positions so that said cells selectively exhibit various color tones to display to a viewer an image appearing to have depth.

5. Apparatus according to claim 4 wherein said colors are achromatic colors.

6. A display panel comprising, in combination, a multiplicity of relatively thin-walled longitudinal cells having passages extending longitudinally therethrough, such cells being arranged in longitudinally parallel relation with the walls of each cell being common to the walls of the adjoining cells and one end of each cell being disposed in the same plane as the corresponding end of the other cells to form a viewing screen, the transverse shape of each cell being substantially geometrically congruent to that of each other cell, the walls of the cells being of a color of substantially low saturation and low brilliance; a light reflecting device disposed in the passage of each said cell and longitudinally movable therein, the end of each such device facing said viewing screen and having a transverse size and shape substantially corresponding to the transverse size and shape of its respective passage, said end of each reflector device being of a color of substantially low saturation and high brilliance, said reflector devices each being movable in its respective cell, means to move said reflectors individually so as to render such reflectors selectively and variably shaded by the walls of each respective cell and thereby vary the tone exhibited by that cell so that said multiplicity of cells may selectively display varying images to a viewer of said screen.

7. Apparatus according to claim 6 wherein said colors are achromatic colors.

8. Apparatus according to claim 6 wherein the first of said colors is black and the second of said colors is white.

9. Apparatus according to claim 6 wherein said means includes electrically controlled devices for selectively positioning each of said light reflecting devices in its respective cell, and a programmer for selectively energizing said electrical devices in accordance with a predetermined program to selectively display said varying images.

10. Apparatus in accordance with claim 9 in which said electrically controlled devices comprise a plurality of solenoid coils.

11. Apparatus in accordance with claim 10 in which the solenoid coils associated with each cell are arranged in a tandem cooperative relationship.

12. An image display screen or panel comprising, in combination; a lattice work of substantially equal length longitudinal cells, each having a thin-walled cavity extending longitudinally therethrough, each cell longitudinally and equally arranged in juxtaposed paallel relation with its bordering cells, and the cross-sectional shape of each cell being geometrically congruent to that of each other cell, the walls forming the cells being of a color of substantially low saturation and of a preselected low brilliance; a plurality of members, one disposed in each of said cavities and longitudinally movable therein, each such member having a cross-sectional size and shape corresponding to the cross-sectional size and shape of its cavity, each such member being of a color of substantially low saturation and of a preselected high brilliance, and means for moving each member individually and longitudinally in their respective cavities to selectively vary the color tones exhibited by each cavity so that different images may be displayed to a viewer facing the ends of the cavities, such images varying according to the relative positions of said members in their respective cavities and the resultant relative color tones exhibited thereby.

13. Apparatus in accordance with claim 12 wherein said means are subject to manual manipulation for movement of said members.

References Cited by the Examiner

UNITED STATES PATENTS

| | | | |
|---|---|---|---|
| 909,444 | 1/1909 | Newell | 40—28 |
| 1,049,240 | 12/1912 | Junecek | 40—52 |

FOREIGN PATENTS

| | | |
|---|---|---|
| 278,560 | 9/1914 | Germany. |
| 856,122 | 9/1952 | Germany. |
| 9,008 of 1909 | 3/1909 | Great Britain. |

EUGENE R. CAPOZIO, *Primary Examiner.*